(12) United States Patent
Perkinson

(10) Patent No.: US 8,182,222 B2
(45) Date of Patent: May 22, 2012

(54) THERMAL PROTECTION OF ROTOR BLADES

(75) Inventor: Robert H. Perkinson, Somers, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 601 days.

(21) Appl. No.: 12/378,213

(22) Filed: Feb. 12, 2009

(65) Prior Publication Data

US 2010/0202892 A1    Aug. 12, 2010

(51) Int. Cl.
*B64C 11/14* (2006.01)
(52) U.S. Cl. ..................... 416/94; 416/220 R
(58) Field of Classification Search ............ 416/94, 416/131, 133, 136, 177, 218
See application file for complete search history.

(56) References Cited

U.S. PATENT DOCUMENTS

| | | | |
|---|---|---|---|
| 4,281,966 A * | 8/1981 | Duret et al. ............... 416/134 A |
| 4,893,989 A | 1/1990 | Carvalho | |
| 5,199,850 A | 4/1993 | Carvalho et al. | |
| 5,380,150 A | 1/1995 | Stahl | |
| 5,439,348 A | 8/1995 | Hughes et al. | |
| 5,451,141 A | 9/1995 | Carvalho et al. | |
| 5,927,942 A | 7/1999 | Stahl et al. | |
| 6,077,040 A | 6/2000 | Pruden et al. | |
| 7,172,391 B2 | 2/2007 | Carvalho | |
| 7,296,969 B2 | 11/2007 | Raes et al. | |
| 7,422,419 B2 | 9/2008 | Carvalho | |
| 2009/0004008 A1 * | 1/2009 | Richards ....................... 416/145 |

* cited by examiner

*Primary Examiner* — Cheung Lee

(74) *Attorney, Agent, or Firm* — Kinney & Lange, P.A.

(57) ABSTRACT

A spinner mounting at least one propeller hub and having a blade platform for each hub formed on the spinner body formed from a thermal insulating material capable of withstanding exhaust gasses. The platform is formed in a shape that presents an aerodynamic surface in the direction of travel of the system, preferably at a predetermined effective blade angle so as to act in concert with the blade and the gas path to minimize drag or to optimize thrust. The system may include two sets of propeller blades, and each includes a spinner and blade platform.

20 Claims, 3 Drawing Sheets

THERMAL PROTECTION OF ROTOR BLADES

BACKGROUND

The present invention relates to propeller systems and more particularly to counter rotating, open rotor propeller systems.

Most gas turbine engines on commercial airliners are known as turbofans. They typically have a fixed pitch fan on the front of the engine with a shroud around it. Some gas turbine engines feature an open rotor propeller system that includes a pair of rotors supporting the propeller blades. The rotors and blades may be mounted behind the gas turbine engine that is supplying power to the rotor system. These propeller blades are not shrouded. This configuration is commonly referred to as a "pusher" configuration.

One variation of the pusher configuration has the hot exhaust gas emanating from the gas turbine engine directly in front of the root of the propeller blades. This hot gas path may attain temperatures of approximately 900° F. (482° C.). The hot gas does not mix with the ambient air stream flowing over the system at this important point of the engine, but, rather, dissipates in the exhaust area behind the aircraft. Depending on the material used to construct the propeller blades, thermal protection may be required to prevent damage to the structural portion of these blades. Loss of the material properties is also of concern.

Open rotor propeller systems include a spinner, which is the aerodynamic body of revolution in the center of the propeller. The spinner is commonly used to provide a smooth aerodynamic contour that covers the hubs and actuators incorporated in the propeller. In this configuration, the spinner surface is exposed to the high temperature exhaust gas from the gas turbine. Inside the spinner is the hub's structural part for holding the blades in place and keeping them from being thrown out by centrifugal force. Also inside the spinner is the pitch change mechanism that allows the pitch of the blades to change, depending upon the thrust demands from the gas turbine engine.

The blades themselves are not protected by the shroud in conventional designs. The blades, typically formed from epoxy and fiberglass, or other composites, are at risk in the 900° F. (482° C.) exhaust gasses.

Spinners are at this time made from materials that protect the inside of the spinner where the pitch change mechanism is, whether it is electric or hydraulic or another mechanism. The materials are thermal insulators, often multi-layer composites that have high thermal insulation. The spinner shroud is not doing any structural work and only has to be strong enough to hold itself together.

SUMMARY

An open rotor propeller system has a spinner mounting at least one propeller hub, spar and blade, and an engine for driving the propeller hub and producing exhaust gas. This system, a counter rotating, open rotor propeller system, has the two rotors supporting the propeller blades mounted behind the gas turbine engine. Also on the spinner is a blade platform for each propeller hub, spar and blade. The system may include two or more sets of propeller blades, and each propeller includes a blade platform.

Both the spinner and the blade platform are formed from a thermal insulating material capable of withstanding exhaust gasses with temperatures of approximately 900° F. (482° C.). The platform is formed in a shape that presents an aerodynamic profile in the direction of travel of the system, preferably at a predetermined effective blade angle so as to act in concert with the blade and the gas path to minimize drag or to optimize thrust.

DETAILED DESCRIPTION

Figure 1:
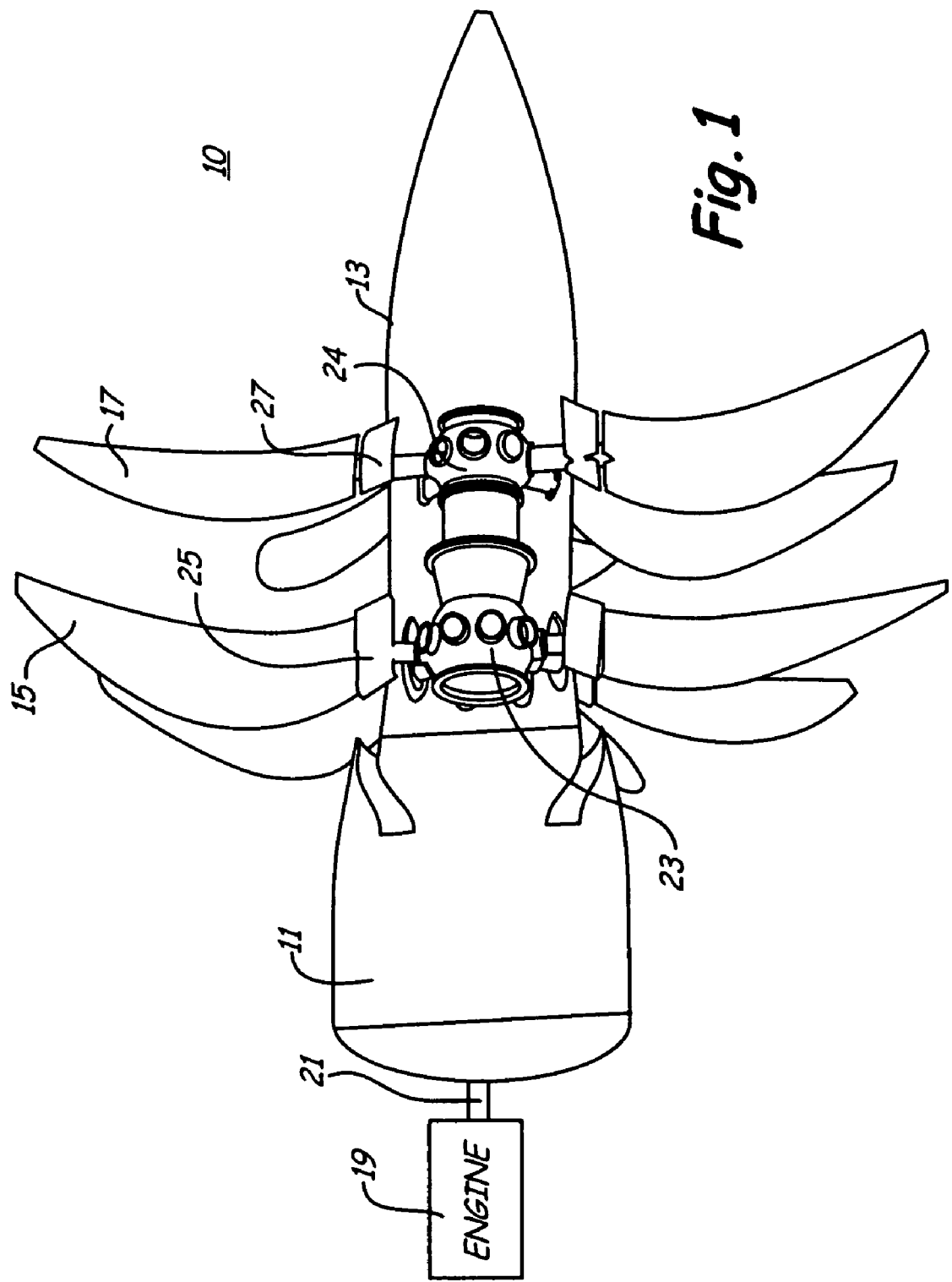
FIG. 1 is a side view, partially cut away, of a counter rotating, open rotor propeller system using the device of this invention.

FIG. 1 shows the aft portion of counter rotation, open rotor propeller system 10, which includes gear box 11, spinner 13, fore propellers 15, aft propellers 17, engine 19, shaft 21, rotor hubs 23 and 24, and platforms 25 and 27. Engine 19, shown in block diagram form, rotates shaft 21 which engages gear box 11. Gear box 11 rotates the propeller system including spinner 13, fore propellers 15 and aft propellers 17. Rotor hubs 23 and 24 are driven by shaft 21 through the gear box 11. Protecting hubs 23 and 24 are platforms 25 and 27, each of which encloses the connection between hubs 23 and 24 and propellers 15 and 17 respectively.

Engine 19 generates intense heat and exhaust gasses that can reach temperatures of approximately 900° F. (482° C.) or higher. Platforms 25 and 27 are made from materials that resist these extreme temperatures.

Figure 2:
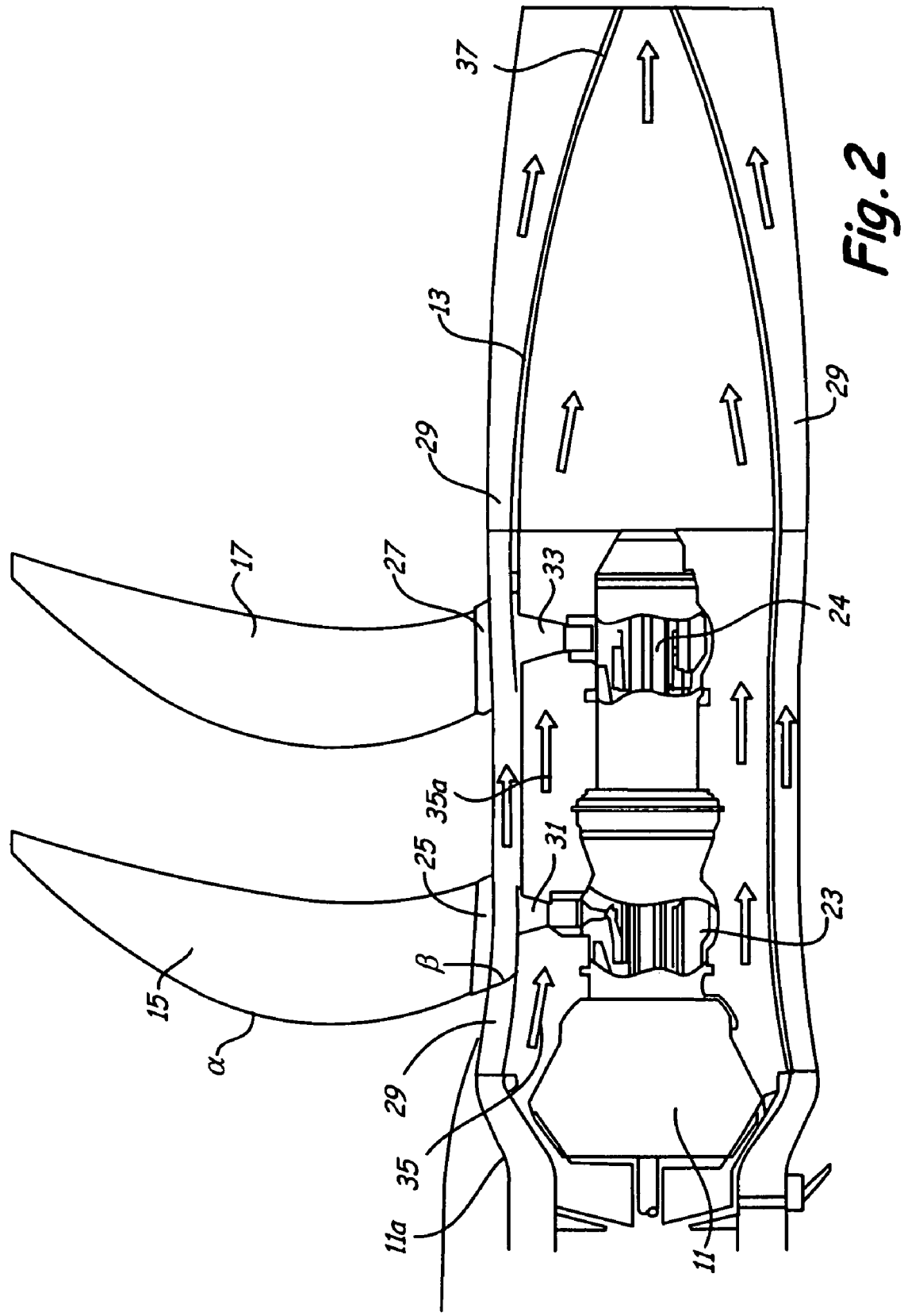
FIG. 2 is a cut away view of the system of FIG. 1.

FIG. 2 illustrates the platforms 25 and 27 on spinner 13 as being directly in the path of exhaust gas 29. Exhaust gas 29 does not mix with the ambient air stream flowing over the system, but, rather, dissipates in the exhaust area behind the aircraft.

Both the spinner 13 and platforms 25 and 27 are formed from a heat resistant material such as a solid thermal insulating material. These three components do not have any weight bearing function and serve to protect the hubs 23 and 24, and the blade retention mechanisms 31 and 33 that connect the hubs 23 and 24 to blades 15 and 17 respectively. The intense heat of the exhaust gas 29 is kept from the portions of the system that would be damaged by direct contact with that heat. Examples of suitable thermal insulating materials are: a high temperature polyimide/carbon-fiber matrix shell with a carbon honeycomb insulating layer, along with a carbon-fiber/epoxy matrix liner; a titanium sheet shell and a metallic mesh insulating layer and liner; and a ceramic coating over a carbon honeycomb insulation, with a structural interior layer of fiberglass.

The function of platforms 25 and 27 is to protect the hubs 23 and 24 from exhaust gas 29, and therefore the height of platforms 25 and 27 should be at least as high as the thickness of exhaust gas 29 as it flows over the spinner 13. Typically exhaust gas 29 will be about two to three inches (5 to 7.6 cm) thick, and platforms 25 and 27 should be at least that high.

Spinner 13 and housing 11a on gearbox 11 form inlet 35 that allows ambient or cooling air 35a to cool the inside of spinner 13 and platforms 25 and 27. Cooling air 35a exits the inside of spinner 13 at its back end 37. In operation, system 10 provides for protection of the hubs 23 and 24 and the blade retention mechanisms 31 and 33 by isolating these components from the hot exhaust gas 29 with platforms 25 and 27, and by passing cooling air 35a over them. Substantially improved component life is achieved by isolating the exhaust gasses from the rotating parts.

Figure 3:
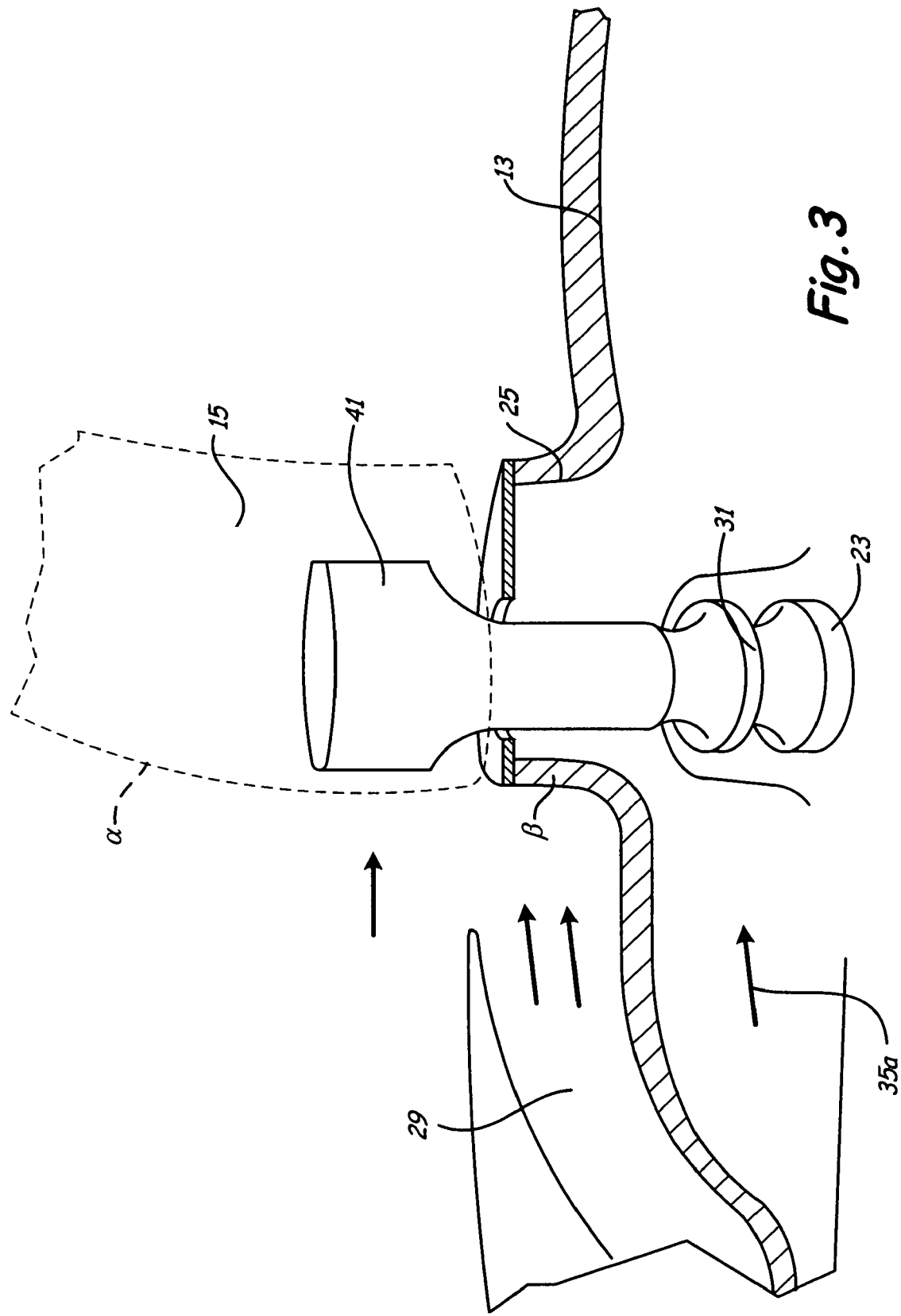
FIG. 3 is an enlarged, cut away view of a portion of the system shown in FIG. 2.

FIG. 3 illustrates the relationship between the device of this invention and its environment in an aircraft in greater detail. Spinner 13 is shown in cross section, with the exhaust gas 29 exiting the engine area and flowing above the surface of spinner 13. Platform 25 is formed from the same material as spinner 13 and, in one embodiment, is formed at the same time as spinner 13, such as in a molding or casting process of the thermal insulating material. The propeller hub 23 is attached to blade retention mechanism 31 and supports a blade spar 41 that is fixedly mounted in blade shell 15. Again there is cooling air 35 inside spinner 11 and platform 25, engine exhaust gas 29 on the outside of spinner 13 and platform 25.

Both FIGS. 2 and 3 show a propeller 15 that has a specific blade angle defined here as angle α, with respect to the plane of rotation. Platform 25 has a cooperating angle defined as angle β, also with respect to the plane of rotation, that compliments the propeller blade angle for a given condition of propeller 15. Most propellers have adjustable blade angles, and angle α for propeller 15 may be set to give minimum drag, such as when the aircraft is at a cruising speed. Alternatively, angle α may be set to optimize thrust, such as during takeoff. Complimentary angle β on platform 25 is not adjustable, but is set to provide an aerodynamic surface in the direction of travel that acts in concert with the propeller. Thus angle β may be set to give minimum drag or optimum thrust, or it may have an angle intended to achieve some other optimization in concert with the propellers. The angle β may also be angled to interact with the exhaust gas 29 to help rotate the propeller in a manner similar to a turbine. In addition, the cross sectional shape of platforms 25 and 27 is normally the same as the cross section of propellers 15 and 17 at the point where the two meet to present an optimum aerodynamic shape of the combination of platform and propeller.

The use of insulating platforms 25 and 27 reduces the cost in design and construction of the propeller blade due to thermal protection of the blade itself, as well as insulating the hubs 23, 24 and other components of the system. These platforms 25 and 27 reduce overall propulsion system weight because the thermal protection is incorporated in spinner 13, which has significantly lower loads. Therefore platforms and spinners may be made of lighter materials. Because the rotating components of the propeller system are protected, the life cycle of these components is extended, increasing reliability and decreasing repair or replacement costs.

Although the present invention has been described with reference to preferred embodiments, workers skilled in the art will recognize that changes may be made in form and detail without departing from the spirit and scope of the invention.

The invention claimed is:

1. A spinner device for an open rotor propeller system having a propeller hub mounting a propeller blade using a rotor blade spar, comprising:
   an aerodynamically shaped spinner body covering the hub of at least one propeller having an aerodynamic blade shape, the spinner being formed from a solid thermal insulating material;
   a blade platform for each propeller, the platform extending radially out from the spinner body proximate the propeller hub and having an opening for the rotor blade spar to mount the blade on the hub, the platform extending radially out at least as far as an exhaust gas stream having a gas path, whereby the platform thermally isolates the hub and spar from exhaust gasses.

2. The device of claim 1, wherein the platform is formed from a thermal insulating material capable of withstanding the exhaust gasses at temperatures of approximately 900° F. (482° C.).

3. The device of claim 1, wherein platform is formed in a shape that presents an aerodynamic surface in the direction of travel of the system.

4. The device of claim 3, wherein the shape compliments the blade shape at a predetermined effective blade angle so as to act in concert with the blade and the gas path.

5. The device of claim 3, wherein the shape and blade angle are set to minimize drag, optimize thrust, or apply rotational forces on the platform to further rotate the propeller.

6. The device of claim 1, wherein the open rotor propeller system includes two rotors supporting two sets of propeller blades, and each set of propeller blades includes a spinner and blade platform.

7. The device of claim 6, wherein both platforms are formed in a shape that presents an aerodynamic surface in the direction of travel of the system to compliment the blade shape at a predetermined effective blade angle so as to act in concert with the blade and the gas path.

8. The device of claim 7, wherein the shape and blade angle are set to minimize drag, optimize thrust, or apply rotational forces on the platform to further rotate the propeller.

9. In an open rotor propeller system having a spinner mounting at least one propeller hub, spar and blades having an aerodynamic blade shape, and an engine for driving the at least one propeller hub and producing exhaust gas, the improvement comprising:
   a blade platform device extending radially out from the spinner at the propeller hub and having an opening for the rotor blade spar to mount the blade on the hub, the platform being formed from a material for thermally isolating the hub and spar from the exhaust gas, the platform extending radially out at least as far as the exhaust gas stream having a gas path.

10. The device of claim 9, wherein the platform is formed from a thermal insulating material capable of withstanding the exhaust gasses at temperatures of approximately 900° F. (482° C.).

11. The device of claim 9, wherein the platform is formed in a shape that presents an aerodynamic surface in the direction of travel of the system.

12. The device of claim 11, wherein the shape compliments the blade shape at a predetermined effective blade angle so as to act in concert with the blade and the gas path.

13. The device of claim 12, wherein the shape and blade angle are set to minimize drag, optimize thrust, or apply rotational forces on the platform to further rotate the propeller.

14. The device of claim 9, wherein the open rotor propeller system includes two rotors supporting two sets of propeller blades, and each set of propeller blades includes a spinner and blade platform.

15. The device of claim 14, wherein both platforms are formed in a shape that presents an aerodynamic surface in the direction of travel of the system to compliment the blade shape at a predetermined effective blade angle so as to act in concert with the blade and the gas path.

16. The device of claim 15, wherein the shape and blade angle are set to minimize drag, optimize thrust, or apply rotational forces on the platform to further rotate the propeller.

17. An open rotor propeller system, comprising:
   at least one propeller hub, spar and blades having an aerodynamic blade shape;

an engine for driving the at least one propeller hub and producing exhaust gas; and a blade platform device on the spinner the platform extending radially out from the propeller hubs and having an opening for the rotor blade spar to mount the blade on the hub, the platform being formed from a material for thermally isolating the hub and spar from the exhaust gas, the platform extending radially out at least as far as the exhaust gas stream gas flow path.

18. The system of claim 17, wherein the platform is formed from a thermal insulating material capable of withstanding the exhaust gasses at temperatures of approximately 900° F. (482° C.).

19. The system of claim 17, wherein the platform is formed in a shape that presents an aerodynamic surface in the direction of travel of the system, wherein the shape compliments the blade shape at a predetermined effective blade angle so as to act in concert with the blade and the gas path.

20. The system of claim 19, wherein the shape and blade angle are set to minimize drag, optimize thrust, or apply rotational forces on the platform to further rotate the propeller.

* * * * *